United States Patent

[11] 3,607,989

| [72] | Inventor | Lawrence F. Sonnabend |
| | | Midland, Mich. |
| [21] | Appl. No. | 773,309 |
| [22] | Filed | Nov. 4, 1968 |
| [45] | Patented | Sept. 21, 1971 |
| [73] | Assignee | The Dow Chemical Company |
| | | Midland, Mich. |

[54] PROCESS FOR PREPARING CATIONIC POLYVINYLAROMATIC RESINS WITH IMPROVED COLOR
4 Claims, No Drawings

[52] U.S. Cl................................................. 260/93.5,
260/2.2, 260/17, 260/29.6, 260/96 HY, 117/201
[51] Int. Cl............................................................. C08f 7/04,
C08f 27/03, C08f 27/08
[50] Field of Search........................................... 260/93.5 A,
96 HY

[56] References Cited
UNITED STATES PATENTS

| 2,597,440 | 5/1952 | Bodamer...................... | 260/93.5 |
| 2,694,702 | 11/1954 | Jones........................... | 260/93.5 |

FOREIGN PATENTS

| 933,596 | 8/1963 | Great Britain................ | 260/83.5 |

*Primary Examiner* — James A. Seidleck
*Attorneys* — Griswold & Burdick and D. B. Kellom ABSTRACT: The color of cationic resins prepared by chloromethylation and amination of soluble, essentially linear polyvinylaromatic resins is improved by hydrogenation of the polyvinylaromatic resins to reduce the residual ethylenic unsaturation prior to chloromethylation. The resulting cationic resins are particularly useful in preparing electroconductive cellulose products.

PROCESS FOR PREPARING CATIONIC POLYVINYLAROMATIC RESINS WITH IMPROVED COLOR

BACKGROUND

The development of poly(vinybenzyl) duplicating methods requiring the use of electrically conductive paper has created a large demand for organic electroconductive resins which can be incorporated into the paper to increase its electroconductivity without serious loss of other desirable paper properties. A particularly effective electroconductive resin is the water dispersible poly quaternary ammonium) resin employed in Silvernail et al. U.S. Pat. No. 3,011,918 and Doggett et al. U.S. Pat. No. 3,110,621.

As synthesis of such electroconductive cationic polymers, the process of Jones, U.S. Pat No. 2,694,702, involving chloromethylation and amination of a soluble polyvinylaromatic resin has considerable merit. However, the electroconductive resins prepared by the Jones process frequently have an initial yellow to yellow-brown color and poor color stability. Treatment of the resins prepared by the Jones' process by conventional techniques for reducing color including hydrogenation, and treatment with activated carbon or a chemical reducing agent fails to give a product with a low color desirable for paper coatings.

STATEMENT OF THE INVENTION

It has been discovered that the color of the polyvinylaromatic electroconductive resin prepared by the process of Jones' U.S. Pat. No. 2,694,702 is improved by hydrogenation of the intermediate polyvinylaromatic resin prior to chloromethylation and amination. More specifically, the improvement comprises: (A) Hydrogenating the essentially linear poly(vinylaromatic) polymer to reduce the residual ethylenic unsaturation to less than about 0.3 wt. percent calculated as vinyl unsaturation prior to chloromethylation, and thereafter (B) Chloromethylating and aminating the hydrogenated polymer to obtain a water-dispersible electroconductive resin having improved color and color stability.

This improvement resulted from the discovery in a careful study of the Jones' process that the residual ethylenic unsaturation in the intermediate, soluble, essentially linear poly(vinylaromatic) polymer was a major source of the final product color and instability. This residual ethylenic unsaturation was found to produce unstable, color-forming impurities during the subsequent chloromethylation and amination. Once formed, these impurities are resistant to removal by conventional means. However, hydrogenation of the intermediate poly(vinylaromatic) polymer prior to chloromethylation and amination is surprisingly effective in improving the color stability and quality of the final electroconductive resin. Also the brightness of paper coated with the improved electroconductive resin is significantly enhanced.

GENERAL DESCRIPTION

Jones' U.S. Pat. No. 2,694,702 describes a process for preparing soluble chloromethylated polymers of styrene and $\alpha$-methylstyrene which can be aminated with a tertiary amine to obtain a water-soluble cationic polymer containing about 0.1–1.0 quaternary ammonium groups per aromatic group. Other soluble vinylaromatic polymers including polymers of vinyltoluene, vinylethylbenzene and similar $C_8$–$C_{14}$ monovinylaromatic monomers can be made by this process.

In examining the color instability of the electroconductive quaternary ammonium polymers prepared by the Jones' process, it was discovered that soluble polyvinylaromatic resins prepared by the Jones' process generally contained about 1–5 wt. percent residual ethylenic unsaturation calculated as vinyl groups ($-CH=CH_2$). Furthermore, to obtain the desired light colored and stable quaternary ammonium product, it is essential to reduce this residual ethylenic unsaturation to less than about 0.3 wt. percent to chloromethylation.

To remove the detrimental ethylenic unsaturation from the soluble polyvinylaromatic polymer, hydrogenation in the presence of a conventional heterogeneous catalyst is particularly effective. Since the ethylenically unsaturated groups in the polymer chain are relatively easily reduced catalytically, a wide variety of catalysts and conditions can be used. Active catalysts, such as Raney nickel, palladium, platinum, and rhodium promote hydrogenation under mild conditions, e.g. at about 20°–60° C. with 2–20 atmospheres of hydrogen pressure. With a less active catalyst, such as supported nickel, copper chromite, nickel boride, promoted iron, molybdenum, cobalt, or tungsten catalysts, effective hydrogenation can be obtained with higher hydrogen pressures, e.g. about 20–300 atmospheres at 20°–200° C. But, in general, the more active catalysts and milder hydrogenation conditions are preferred.

To provide more effective contact between the soluble polymer and heterogeneous catalyst, and to facilitate heat transfer, an inert solvent or diluent can be used. Aromatic or saturated aliphatic hydrocarbons such as benzene, toluene, n-heptane, and cyclohexane as well as hydrocarbon mixtures as petroleum ether are suitable. Also saturated $C_1$–$C_4$ chlorinated solvents stable under the hydrogenation conditions, such as methylene chloride, 1,2-dichloroethane, carbon tetrachloride, 1,2-dichloropropane, can be used. Indeed such chlorinated solvents are also effective solvents for the subsequent chloromethylation and amination.

The catalytic hydrogenation of the polyvinylaromatic resin is carried out until a residual ethylenic unsaturation of less than about 0.3 wt. percent calculated as vinyl unsaturation ($-CH=CH_2$) is obtained. Then the hydrogenated resin is chloromethylated and aminated to yield a soluble quaternary ammonium electroconductive resin.

Suitable processes for chloromethylation and amination of such soluble vinylaromatic polymers are well known. However, chloromethylation with chloromethyl ether and amination with an aqueous solution of a tertiary aliphatic amine such as trimethylamine, dimethylbutylamine, triethanolamine or dimethylisopropanolamine as described by Jones' U.S. Pat. No. 2,694,702 are particularly satisfactory.

PAPER COATING

In preparing an electrographic paper, a base stock paper is usually treated first with the electroconductive resin and then coated with a photoconductive layer normally containing finely divided zinc oxide in a suitable insulating binder. The improved cationic electroconductive resin is applied as an aqueous solution to the preformed paper stock by spraying, dipping, brushing, calendaring or similar conventional technique for impregnating or coating paper stock with the aqueous resin solution or dispersion. Depending on the specific electroconductive properties desired, it can be incorporated as a surface coating on one or both sides of the sheet, or by impregnating through the sheet. Preferably it is applied from aqueous solution at the size press or calendar stack of the paper machine. But it also may be applied in a subsequent coating or padding operation.

Advantageously, the electroconductive resin is applied by treating the paper sheet with an aqueous solution or dispersion containing about 5–40 weight percent of the resin and having a pH of about 2.0–3.0 to obtain a substantially uniform coating with a pickup of about 1–10 weight percent electroconductive resin. With a standard electrographic base paper, this corresponds to a surface coating of about 0.75–7.5 g./m².

Because of the compatibility of the improved electroconductive resin with many conventional paper coating additives including binders and thickeners, the additive solution can be readily formulated for particular properties. For example, a cellulose ether or other thickener may be desirable to minimize surface penetration.

To illustrate further the present invention, the following examples are given. Unless otherwise stated, all parts and percentages are by weight. The ethylenic unsaturation is determined by standard UV and iodine number analyses. The Gardner color analyses are determined by ASTM Method D-154-47.

Example 1 Conventional Polystyrene Product

A. A toluene soluble, essentially linear polystyrene was prepared by a peroxide catalyzed polymerization of styrene as described by Jones' U.S. Pat. No. 2,694,702. This soluble polystyrene had an average molecular weight of about 25,000 and contained 2.96 percent ethylenic unsaturation calculated as vinyl groups.

B. Using the Jones process, 62 parts )(0.60 mole) of the soluble polystyrene described in example 1A was chloromethylated by adding to a solution of 191.5 parts (2.38 moles) of chloromethyl methyl ether and 12.7 parts (0.16 mole) zinc oxide in 176.5 parts of 1,2-dichloroethane cooled to 10° C. The mixture was held at 45°–47° C. for 6 hours to give a chloromethylated polystyrene containing an average of 0.722 chloromethyl groups per aromatic group. This product was washed with water and then with dilute aqueous sodium hydroxide.

C. To the solution of chloromethylated polystyrene in 1,2-dichloroethane was added 61 parts of water and 270 parts (1.16 mole) of 25 percent aqueous trimethylamine. The mixture was stirred at 35° C. for 1.5 hours before stripping the 1,2-dichloroethane, excess amine and a portion of the water under reduced pressure at 40°–60° C. The final product was a dark yellow-brown aqueous solution containing 32.6 percent resin solids and having a Brookfield viscosity of 133 centipoise and a Gardner color of between 8 and 9.

D. In an attempt to improve the color of the final product, two 100-part samples of the 32.6 percent solution were treated with 5 parts and with 10 parts of 20 percent aqueous sodium bisulfite solutions without discernible change in the Gardner rating. Treatment of a third 100-part sample with about 10 parts of activated charcoal also failed to yield any significant improvement in color. Similarly hydrogenation of the final aqueous product is not effective in reducing the color.

Example 2 Hydrogenated Polystyrene Product

A. To a solution of 200 parts of the soluble, polystyrene described in example 1A (2.96 percent ethylenic unsaturation) in 200 parts cyclohexane was added 2 parts of 5 percent palladium on charcoal catalyst. The mixture was hydrogenated in a Parr bomb at room temperature with a hydrogen pressure of about 3 atmospheres for 4 hours. After removing the catalyst and cyclohexane, a soluble polystyrene was obtained which contained 0.12 percent residual ethylenic unsaturation.

Using the method of example 1, 46.5 parts of the hydrogenated polystyrene was chloromethylated and quaternized with trimethylamine. The resulting product contained an average of 0.77 quaternary ammonium groups per aromatic group, and had a viscosity of 120 cps. as an aqueous solution containing 32.1 percent resin solids. Its Gardner color was between 2 and 3.

B. In a similar experiment 200 parts of the soluble polystyrene in 200 parts 1,2-dichloroethane was hydrogenated for 4.5 hours at 35–40° C. with about 7 atm. hydrogen and 3.5 parts of Raney nickel catalyst. The residual unsaturation was below 0.2 percent and the chloromethylated and aminated product had a Gardner color of 3.

C. A mixture of 875 parts of a soluble polystyrene containing 2-3 percent residual unsaturation, 875 parts of 1,2-dichloroethane, and 12.5 parts of 5 percent Pd on carbon catalyst was heated with stirring to 40° C. and held at about 40° C. with a hydrogen pressure of 4–5 atm. for 2 hours. Another 875 parts of 1,2-dichloroethane was added and the mixture filtered to remove the catalyst. The residual ethylenic unsaturation of the hydrogenated polystyrene was less than 0.1 percent. Chloromethylation and amination with aqueous trimethylamine gave a product similar to that described in example 2A having a Gardner color of less than 1.

Example 3 Residual Unsaturation

Table 1 gives the ethylenic unsaturation of several blends of an unhydrogenated polystyrene containing 1.53 percent ethylenic unsaturation (3–7) and a hydrogenated polystyrene containing 0.10 percent ethylenic unsaturation (3–1) and the Gardner color rating of the chloromethylated-aminated products made from each blend by the process of example 1. For a light color electroconductive resin, theses data indicate that the intermediate polyvinylaromatic resin should have a residual ethylenic unsaturation of less than 0.30 percent, and preferably less than about 0.20 percent.

TABLE 1

Residual Ethylenic Unsaturation v

Gardner Color

| Sample | %-CH=CH$_2$ | Gardner Color |
|---|---|---|
| 3–1 | 0.10 | 1 |
| 3–2 | 0.11 | 1–2 |
| 3–3 | 0.13 | 2–3 |
| 3–4 | 0.17 | 2–3 |
| 3–5 | 0.23 | 3–4 |
| 3–6 | 0.29 | 4–5 |
| 3–7 | 1.53 | 8–9 |

Example 4 Electroconductive Paper

Samples of the soluble electroconductive resins described in example 1C (unhydrogenated, 2.96 percent ethylenic unsaturation) and example 2A (hydrogenated, 0.12 percent ethylenic unsaturation) were applied with a No. 7 Meyer rod to the sized side of a commercial bleached sulfite base stock paper to give a dried coating weight of 3 lbs./3000 ft.$^2$ (about 5 g./m.$^2$). As shown by the data in table 2, the electroconductive resin prepared from hydrogenated polystyrene gave equivalent performance in the surface electric resistance test at 7 percent RH and 23° C. and a significant improvement in color and color stability as measured by the sensitive reflectance or "brightness" test after accelerated heat aging. The brightness measurement was made by the procedure of Tappi Method T-452.

TABLE 2

Comparison of Electroconductive Paper

| Resin | 2A | 1C |
|---|---|---|
| Ethylenic Unsaturation | 0.12% | 2.96 |
| Gardner Color at 20% solids | 1–2 | 9–10 |
| Surface Resistivity, ohms/square | 5.8×10$^7$ | 1.6×10$^8$ |
| Heat Stability of Coated Paper | | |
| Initial | 81.5$^a$ | 79.5$^a$ |
| 4 hrs. at 104.5° C. | 80.0$^a$ | 77.5$^a$ |
| 8 hrs. at 104.5° C. | 79.5$^a$ | 77.0$^a$ |
| 24 hrs. at 104.5° C. | 78.5$^a$ | 76.0$^a$ |

$^a$ Brightness as measured by standard reflectometer.

I claim:

1. In a process for producing an electroconductive resin by chloromethylation and amination of a soluble, essentially linear, polyvinylaromatic resin the improvement which comprises:

A. Hydrogenating the essentially linear polyvinylaromatic resin to yield an essentially linear polyvinylaromatic resin containing a residual ethylenic unsaturation of less than about 0.3. weight percent, and thereafter B. Chloromethylating and aminating the hydrogenated polyvinylaromatic resin to obtain a water-soluble quaternary ammonium electroconductive resin having improved color and color stability.

2. The process of claim 1 where the polyvinylaromatic resin is an essentially linear polystyrene.

3. The process of claim 1 where the hydrogenation is carried out at about 20°–60° C. using a palladium catalyst and about 2–20 atmospheres hydrogen pressure.

4. The process of claim 3 where after hydrogenation the polyvinylaromatic resin is chloromethylated and then aminated with trimethylamine to yield a water-soluble electroconductive resin containing an average of about 0.1–1.0 quaternary ammonium groups per aromatic group.